United States Patent [19]

Peterson

[11] Patent Number: 5,115,997
[45] Date of Patent: May 26, 1992

[54] SURVEILLANCE BALLOON

[75] Inventor: John M. Peterson, Madison, Ala.

[73] Assignee: Teledyne Industries, Inc., Los Angeles, Calif.

[21] Appl. No.: 464,388

[22] Filed: Jan. 12, 1990

[51] Int. Cl.$^5$ ............................................. B64B 1/20
[52] U.S. Cl. ....................................... 244/25; 244/33; 244/31; 244/29
[58] Field of Search .................. 244/33, 31, 25, 5, 29, 244/97, 98, 99, 125; 446/30, 225

[56] References Cited

U.S. PATENT DOCUMENTS

| | | |
|---|---|---|
| 870,430 | 11/1907 | Herve . |
| 970,262 | 9/1910 | Von Parseval ........................ 244/97 |
| 998,538 | 7/1911 | Lehmann .............................. 294/97 |
| 1,376,121 | 4/1921 | Smyth .................................. 244/33 |
| 1,471,656 | 10/1923 | Hall . |
| 1,686,646 | 7/1926 | Upson .................................. 244/33 |
| 1,925,427 | 9/1933 | Wurtzer ............................... 446/30 |
| 2,433,344 | 12/1947 | Crosby ................................. 244/33 |
| 2,476,678 | 7/1949 | Miller ................................. 446/180 |
| 2,960,298 | 11/1960 | Jones ................................... 244/153 |
| 3,092,359 | 10/1961 | Pohl .................................... 244/154 |
| 3,120,366 | 2/1964 | Coffey ................................. 244/153 |
| 3,131,895 | 5/1964 | Moore ............................ 244/153 R |
| 3,151,825 | 10/1964 | Kindling ............................. 244/33 |
| 3,446,458 | 5/1969 | Rogallo ............................... 244/43 |
| 3,521,836 | 7/1970 | Struble ................................ 244/33 |
| 3,620,486 | 11/1971 | Charpentier ......................... 244/33 |
| 4,032,086 | 6/1977 | Cooke ................................. 244/97 |
| 4,050,653 | 9/1977 | Sayers ................................. 244/25 |
| 4,073,516 | 2/1978 | Kling ................................... 244/33 |
| 4,102,519 | 7/1978 | Crosby, Jr. .......................... 244/125 |
| 4,125,233 | 11/1978 | Winker et al. ....................... 244/33 |
| 4,149,688 | 4/1979 | Miller ............................... 244/12.4 |
| 4,261,534 | 4/1981 | Roselli ................................. 244/31 |
| 4,375,280 | 3/1983 | Nicolaides .......................... 244/13 |
| 4,403,755 | 9/1983 | Gutsche .......................... 244/53 R |
| 4,547,167 | 10/1985 | Bergmann ........................ 446/220 |
| 4,722,498 | 2/1988 | Cameron ....................... 244/153 R |
| 4,842,219 | 7/1989 | Jakabowski et al. ................ 244/31 |

Primary Examiner—Joseph F. Peters, Jr.
Assistant Examiner—Christopher P. Ellis
Attorney, Agent, or Firm—Beveridge, DeGrandi & Weilacher

[57] ABSTRACT

A tethered surveillance balloon having a relatively low lift-to-weight ratio (e.g., 1.1) and an aerodynamic device to help maintain the surveillance balloon elevation when subject to high velocity wind conditions at an altitude which is a high percentage of the altitude the surveillance balloon would assume if there was zero wind velocity and all other conditions were the same (e.g. temperature, air density). The surveillance balloon also includes a sensing device such as a TV detector for detecting objects and relaying information to a ground station and with possibly a target designation device, if so desired. The balloon is formed of a material which is virtually, if not entirely, radar and visibly transparent.

32 Claims, 11 Drawing Sheets

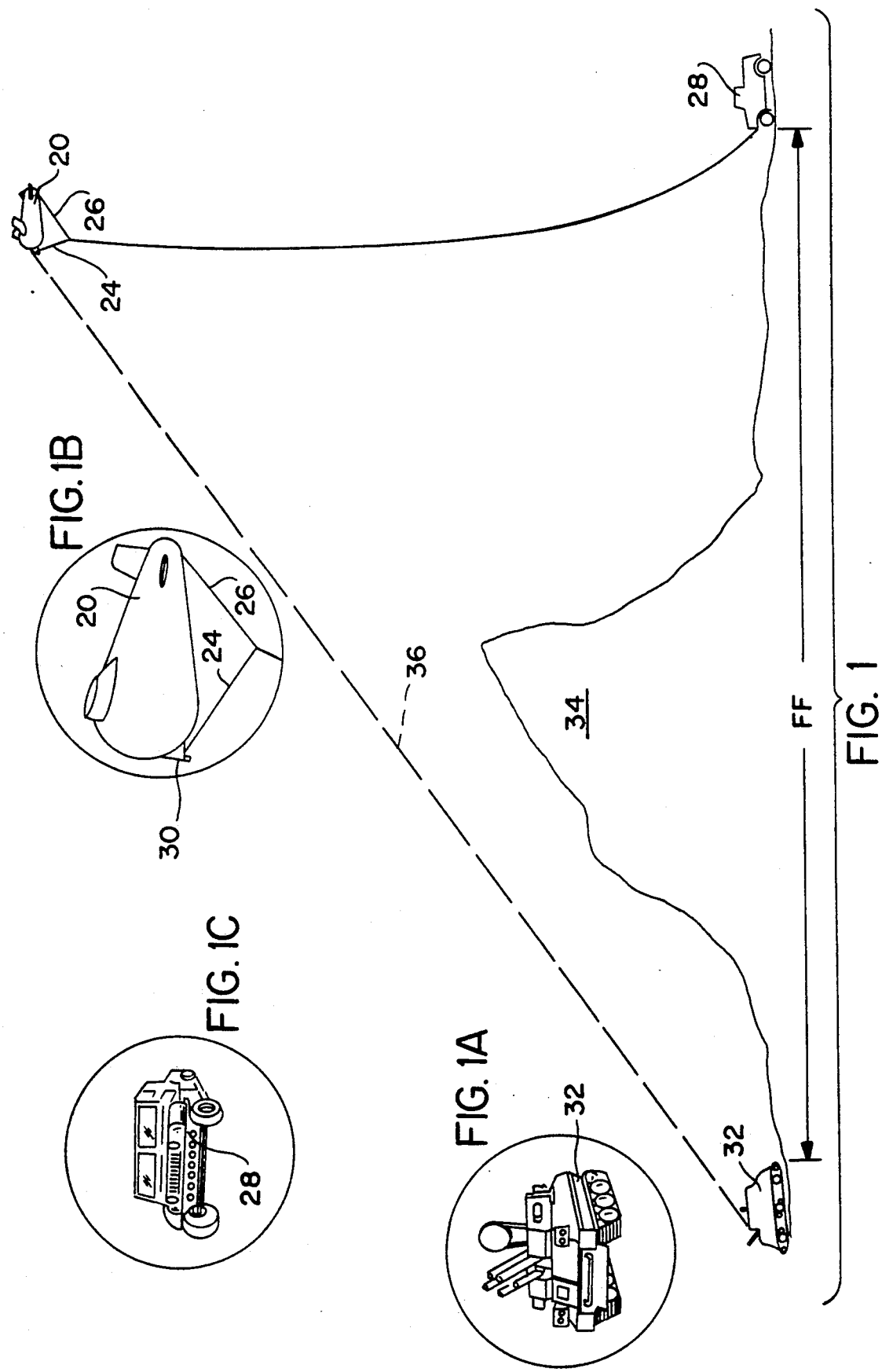

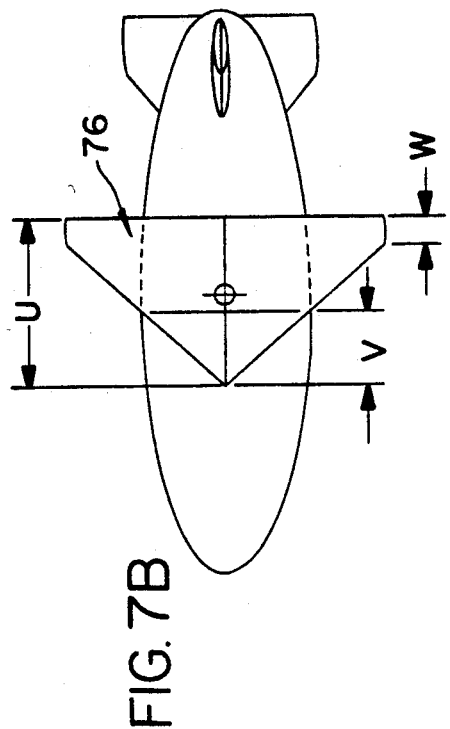
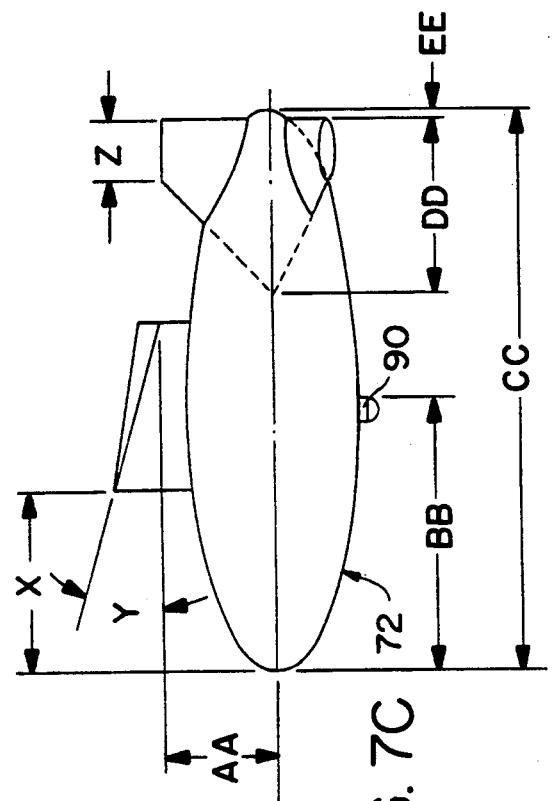
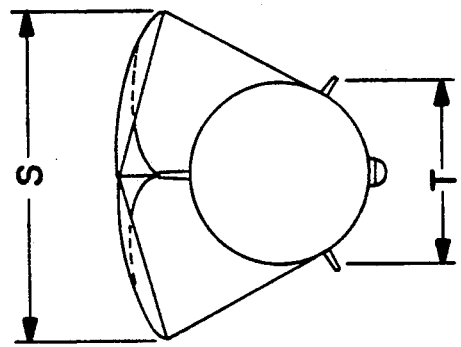

SURVEILLANCE BALLOON

BACKGROUND OF THE INVENTION

1. FIELD OF THE INVENTION

This invention relates to a tethered surveillance balloon. More particularly, this invention relates to a tethered surveillance balloon having an inflatable main body in combination with an aerodynamic lifting device.

2. DESCRIPTION OF RELATED ART

Gas filled surveillance balloons have been utilized for quite sometime for military and research purposes. In fact, gas observation platforms were used by both sides in the American Civil War and again in World War I. Such balloons were generally gas filled and anchored to the ground by long cables. With the development of planes during the later stages of World War I, gas filled balloons were generally less relied upon. Gas filled balloons, however, made a comeback in World War II when barrage balloons were used to protect ships and cities from aerial attack. The "Caquot" type balloon was used extensively during World War II as an aerial observation post and also as a barrage balloon. "Caquot" balloons were designed to withstand winds of about 50 miles per hour and rise to heights of about 6,000 feet. When in use as barrage balloons, a plurality of the gas filled balloons were held captive by steel anchor wires arranged to form a curtain which posed a serious hazard to low flying enemy aircraft. Nonetheless, to maintain the desired height while withstanding winds of about 50 miles per hour, the balloons required a high lift-to-weight ratio. To achieve this relatively high lift-to-weight ratio, the balloons had to be formed of relatively large volumes. These balloons were thus easy to spot both from the ground and in the air.

U.S. Pat. No. 870,430 to Herve discloses a captive observation balloon used for military or scientific purposes. The balloon includes an elongated body having a plurality of interconnected auxiliary gas filled chambers at its aft end to stabilize the captive balloon. Like the Caquot balloon, the Herve balloon relied upon a high lift-to-weight ratio, to achieve the desired height. In order to achieve this high lift-to-weight ratio, the balloon was formed with a relatively large volume making detection and destruction (at least when used for military purposes) easy.

Prior art balloons were also not radar transparent and were often formed of a material which did not blend into the background. The requirement for a large volume balloon also necessitated large storage facilities and made transportation more costly and difficult. Furthermore, since the amount of gas necessary to fill the balloon is directly proportional to its volume, the large volume prior art balloons were expensive to fill with gases such as hydrogen and helium.

Any attempt to reduce the volume of the prior art inflatable balloons resulted in a decrease in the lift-to-weight ratio. Thus, although a reduced volume observation balloon having the general structure as that of the prior art might achieve sufficient height in still air, high wind conditions would result in both a drifting and a decrease in altitude. A decrease in altitude would also make the observation balloon more easy to detect and destroy when utilized for military purposes.

SUMMARY OF THE INVENTION

The present invention, among other things, presents a solution to the aforementioned problems associated with the prior art. In so doing, the present invention provides a surveillance balloon which is of a relatively small volume, lightweight, easy to store and transport, and capable of maintaining a sufficiently high altitude either in low wind conditions or high wind conditions.

The present invention is thus useful for a variety of uses including forest fire detection, border surveillance, military surveillance and scientific research to name a few. In achieving the foregoing advantages over the prior art, the present invention features a very small, not easily detected tethered balloon having an inflated main body of relatively low volume which makes it well suited for military use. The lift-to-weight ratio due to atmospheric displacement is relatively low but sufficient to maintain the desired altitude for still air wind conditions.

To prevent excessive drifting and decreases in altitude in high wind conditions, the surveillance balloon of the present invention also includes an aerodynamic lifting device. The lifting device acts to maintain the main inflatable body at the desired altitude even when the inflated main body is subjected to high wind conditions such as 50 mph winds.

Gas to fill the balloon can be any lighter than air gas such as helium or hydrogen. Pure hydrogen presents a fire and/or explosive hazard while pure helium is heavier than hydrogen. By utilizing a mixture of hydrogen and helium, the volume of the main body can be reduced, as compared to helium only, while maintaining the desired lift-to-weight ratio. Hydrogen provides the best desired lift per volume of gas between the two and a balloon filled with hydrogen would be desirable from a lift standpoint. However, as hydrogen is flammable, a mixture of 85% hydrogen and 15% helium provides not only a good lift-to-weight ratio but is also non-flammable and thus safer than using 100% hydrogen. Consequently, in utilizing the 85% hydrogen and 15% helium mixture the volume of the balloon can be maintained at a low lift-to-weight ratio due to displacement and the problems of flammability are avoided.

The main body and the aerodynamic lifting device of the present invention are made of a material which is both essentially visually and radar transparent. A first embodiment of the present invention features a tethered balloon with an inflatable main body having a semi-spherical front end, a frusto-conical mid-region and a smaller semi-spherical aft end. Attached near the upper front portion of the surveillance balloon is a pair of stub wings, the stub wings are adjoined to the surveillance balloon in the region where the semi-spherical front end joins with the frusto-conical mid-region. The stub wings are also preferably inclined slightly upwardly (dihedral) for stability purposes. Attached to the lower portion of the semi-spherical front end is a payload pod containing various surveillance devices.

In the region where the frusto-conical mid-region joins with the semi-spherical aft end there is attached a pair of side fins and a vertical stabilizing fin.

A tethered cable formed preferably of a radar transparent material is connected to a pair of lines forming a harness. One of the pair of harness lines is joined to the front end of the surveillance balloon while the other of the harness lines is attached to the aft end of the balloon. Preferably the harness line attached to the front end of the balloon is attached above and in front of the payload pod so as to be attachable to the tether line without contacting the pod. In addition to the first pair of harness lines, a second pair of harness lines is also contemplated with each having one end attached to the tip of a respective one of the pair of stub wings. The ends of each harness line, not in contact with the balloon, converge to a common point of attachment with the tether line. An electrical cable or fiber optic line provides the means to transmit payload data to a ground station.

A second embodiment of the invention features an inflated ellipsoidal shaped main body having a pair of horizontal stabilizing fins and a vertical stabilizing fin attached to its aft end. In addition, the aerodynamic lifting device features a flex wing which is connected at its forward and aft centerline tips and its lateral edges to the ellipsoidal shaped main body. The flex wing is positioned above the upper surface of the main body so as to span the center of gravity point of the ellipsoidal shaped main body. The flex wing is inclined with respect to the upper surface of the main body so as to provide an angle of attack for contact with in-rushing air. The flex wing also preferably includes centerline and wing leading edge frame sections. The wing leading edge frames extend laterally out away from the sides of the main body. Connecting lines attach the lateral most ends of the flex wing to the sides of the main body and additional connecting lines extend from the upper surface of the main body and connect with the forward and aft tips of the flex wing centerline frame. A payload pod is positioned on the undersurface of the ellipsoidal main body below the flex wing. The main body and the flex wing including its frame structure, are formed of a material which is radar transparent and difficult to visually detect. For example, the flex wing and frame can be formed of a clear plastic material.

Within the payload pod is a surveillance system which includes various sensor means such as TV or infrared sensor assemblies for assistance in pinpointing the location of detected objects. The payload pod that can be used for all embodiments of the invention is conventional and any suitable devices can be incorporated therein.

In a third embodiment of the invention, the main body is ellipsoidal as in the second embodiment but the major diameter of an elliptical bisecting cross-section far exceeds the minor diameter and thus a cigar shaped object is formed. A payload pod is positioned in the mid-region of the cigar shaped main body with the harness supporting the payload pod extending about the outer surface of the cigar shaped main body. A flex wing is connected to the main body with its forward tip positioned forward of the payload pod and its trailing edge rearward of the payload pod. The forward and aft tips of the flex wing centerline frame are connected by a line or attachment to the upper surface of the main body while the lateral ends of the flex wing are attached to connecting lines which converge towards a common attachment point with the ground tethered line. Additional lines extend from the forward and aft ends of the main body to the common attachment point with the tethered line.

In utilizing the above-described embodiments, there is provided a surveillance balloon having a minimum volume and thus a relatively low lift-to-weight ratio (e.g., between about 1.05 to 1.15) which is still able to maintain its altitude virtually regardless of the wind conditions.

BRIEF DESCRIPTION OF THE DRAWINGS

FIGS. 1 and 1A-C shows, schematically, the present invention being utilized in a military field operation;

FIGS. 7A-C show preferred dimensions of the embodiment shown in FIGS. 6A-C for a useful load of 18 to 20 pounds;

DESCRIPTION OF THE PREFERRED EMBODIMENTS

Figure 2B:
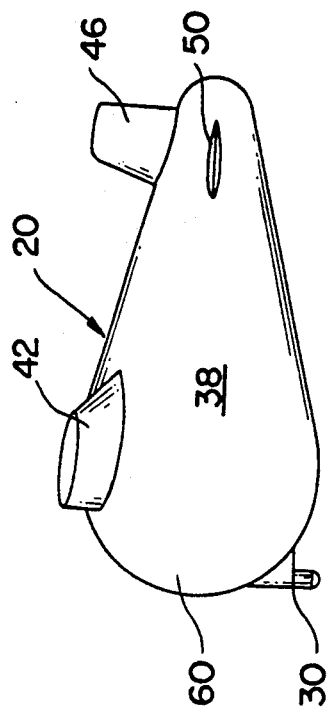
FIG. 2B shows a side view of the embodiment shown in FIG. 2A.

FIGS. 1 and 1A-C illustrate surveillance balloon 20 being utilized for military purposes. Surveillance balloon 20 is connected to tether line 22 by way of harness lines 24, 26. Tether line 22 is connected to mobile ground unit 28 which includes a reeling device or the like (not shown). Surveillance balloon 20 also includes payload pod 30 attached to its undersurface near the forward end. Ground vehicle 32, positioned about 10 kilometers (distance FF) away from mobile unit 28 and on the other side of hill 34, is sensed by surveillance balloon 20.

Detection line 36 represents laser designator 38 (FIG. 9) which provides a means for pinpointing the exact location of vehicle 32 and illuminating it for a laser homing weapon. Hence, surveillance balloon 20 enables those operating ground unit 28 to monitor the movement of any vehicle such as vehicle 32 and also pinpoint and illuminate the target for weapon delivery. More specifically, detection line 36 represents the "line-of-sight" of the embodied sensor (Television (TV), Low Light Level Television (LLTV), Imaging Infra Red (IIR), Radar, etc.) as well as a possible laser radiation used for target illumination for distance measurement and/or for a weapon which homes on reflected laser energy.

Surveillance balloon 20 is preferably made of a transparent material such as the polyester polyethylene terephtalate sold under the trademark MYLAR which makes both aerial and ground visual detection difficult. Moreover, the material forming surveillance balloon 20 is radar transparent so as to avoid detection by enemy aerial and ground radar units.

Figure 2C:
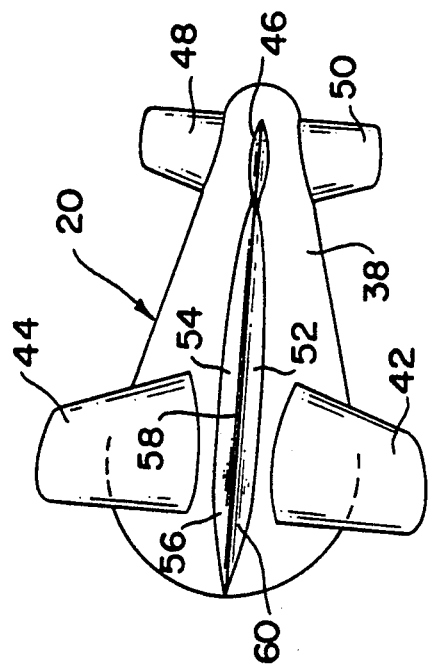
FIG. 2C shows a planar view of the embodiment shown in FIG. 2A.
Figure 2A:
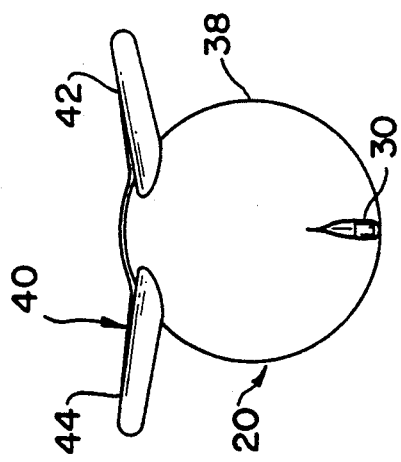
FIG. 2A shows a front elevational view of a first embodiment of the invention.

FIG. 2A shows surveillance balloon 20 having main body 38 as well as an aerodynamic lifting device 40 which comprises stub wings 42 and 44. Inflatable main body 38 is formed so as to have a minimum displacement volume to avoid detection and also reduce storage space.

The balloon obtains its lift by displacement which is a static force not requiring movement through the air. Accordingly, main body 38 is required to have a still air lifting force sufficient to maintain main body 38, payload pod 30 and all other attachments including tether line 22 at a desired altitude. The balloon is in equilibrium (i.e., balanced in the air and not moving up or down), when its total weight, with attachments, is the same as the weight of the volume of the air it is occupying or displacing. Thus, the surveillance balloon will rise in altitude until the lower density air being displaced by the balloon is equal in weight to the surveillance balloon 20 with attachments. However, as will be explained in more detail hereafter, wind forces acting on a tethered surveillance balloon tend to force the tethered balloon horizontally away from its anchor location and vertically downward from its maximum altitude or equilibrium position.

Stub wings 42, 44 are preferably also inflated with the same type of gas filling main body 38 such that stub wings 42, 44 will enhance the vertical static lifting force of the surveillance balloon 20. Stub wings 42, 44, however, also provide an additional aerodynamic lift whenever wind forces begin to impinge on the stub wings which is assured since vertical tail 20 points the balloon towards the prevailing wind that comes into play. The enhanced aerodynamic lifting forces created by stub wings 42, 44 enables surveillance balloon 20 to maintain a lifting force sufficient to overcome the drag of the impinging wind forces. Consequently, stub wings 42, 44 enable surveillance balloon 20 to retain essentially its no wind equilibrium position even in high wind conditions.

In FIGS. 2B-2C there is shown vertical stabilizing fin 46 and horizontal stabilizing fins 48, 50. Stabilizing fins 46, 48 and 50 help to maintain main body 38 in a horizontal position and keeps the balloon heading into the relative wind direction. Fins 46, 48 and 50 can also be gas filled so as to allow for even a lower volume main body at a predetermined lift-to-weight ratio. A preferred lift-to-weight ratio for the entire configuration is between 1.05 and 1.15. This range is also applicable to the additional embodiments of the present invention which are described below.

FIG. 2C shows a planar view of surveillance balloon 20 as well as dilation device 56 formed in the central upper surface of main body 38. Dilation device 56 includes panels 52 and 54 which diverge inwardly from the surface of main body 38 and come together at connection line 58 so as to form recess 60. Dilation device 56 allows for expansion of the gas contained by main body 38 as higher altitudes are reached.

Figure 2D:
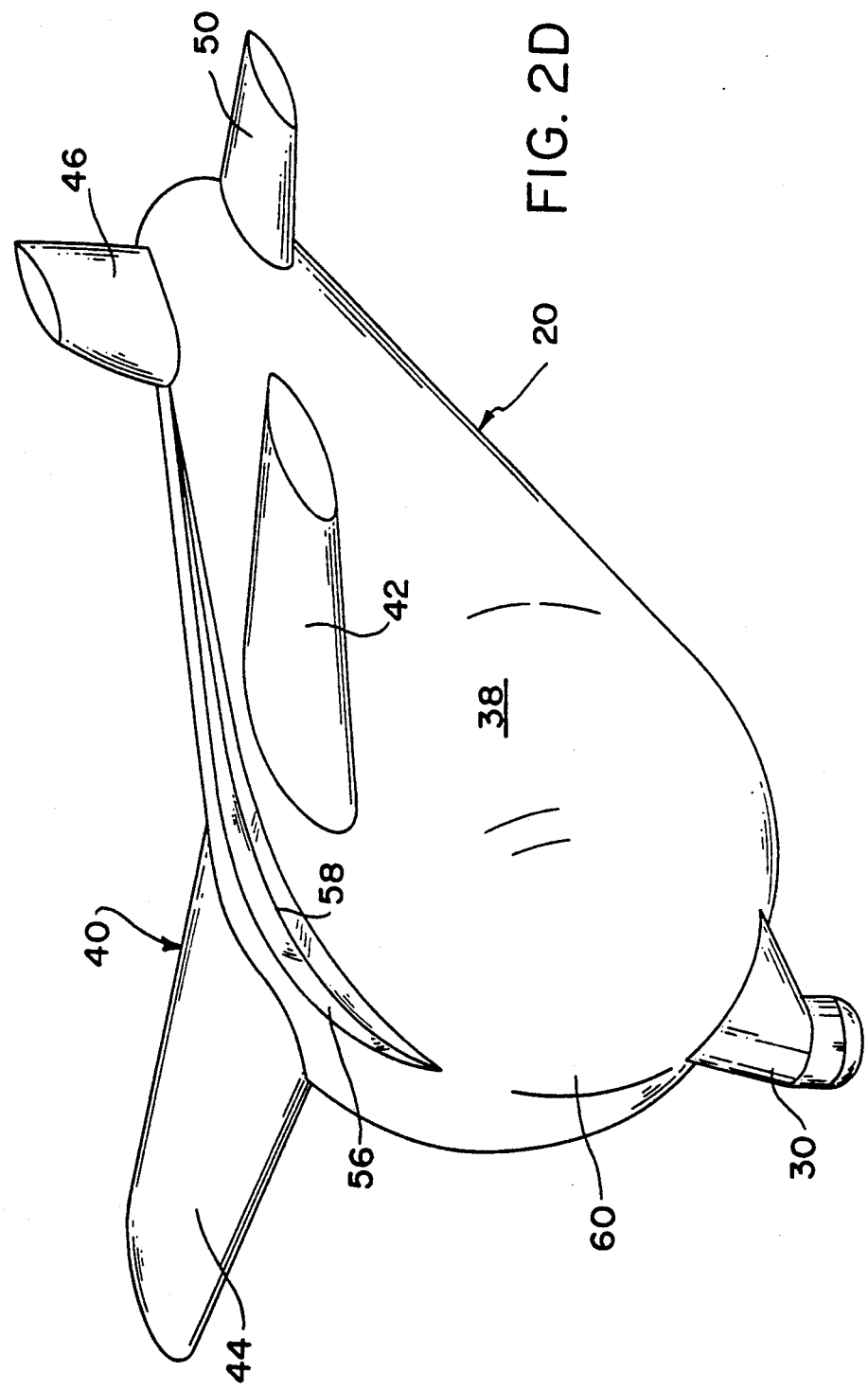
FIG. 2D shows, in perspective, the first embodiment of the invention.

FIG. 2D shows, in perspective, surveillance balloon 20. Payload pod 30 is connected to the semi-spherical front end 60 preferably by adhering, tying or sewing the pod to patches sewn or adhered to the main body. Payload pod 30 utilizes radar absorbing material to minimize its reflectivity to radar.

Figure 3B:
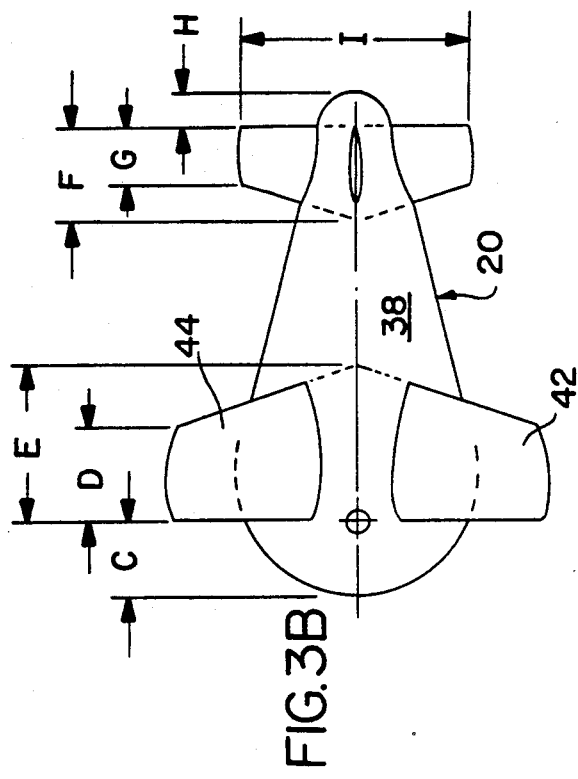
FIGS. 3A-3C show typical dimensions for a useful load of 18 to 20 pounds.
Figure 3C:
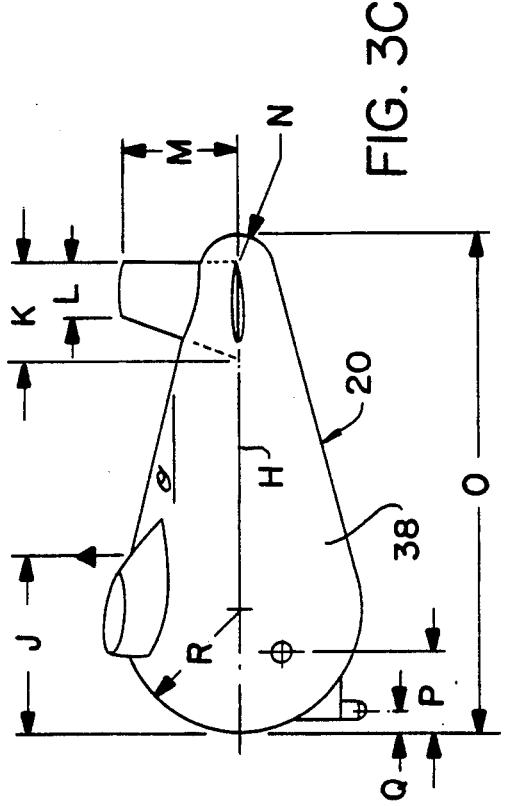
Figure 3A:
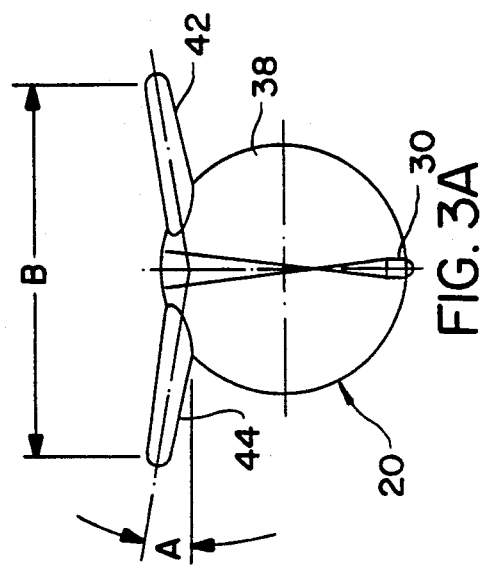

FIGS. 3A-C illustrate preferred dimensions and angular relationships of surveillance balloon 20. The dimensions for FIGS. 3A-C are as follows (all dimensions in feet unless otherwise indicated):

A = 10°
B = 15.6
C = 3.14
D = 3.9
E = 6.5
F = 4.06
G = 2.4
H = 1.5
I = 9.74
J = 7.5
K = 4.06
L = 2.4
M = 4.87
N = 1.5
O = 21.14
P = 3.37
Q = 0.83
R = 5.14

The dimensions illustrated in FIGS. 3A-C reveal the most preferred for a surveillance balloon having a desired equilibrium altitude of 8281 feet (1,000 meter tether length originating at 5,000 ft above sea level) for a temperature of 72.4° F. Table I below provides further characteristics of the embodiment shown in FIGS. 3A-C. In addition, Table II presents a weight analysis of surveillance 20 and all attached components including the tether cable.

TABLE I

| *Desired Equilibrium altitude = 8281 ft at 72.4° F. | | | |
|---|---|---|---|
| Surveillance Balloon | Stub Wings only | Horizontal Fins | Vertical Fins |
| Gross Weight = 43.9 lbs. | Total Surface Area = 81 ft$^2$ | Total Surface Area = 31.4 ft$^2$ | Total Surface Area = 15.7 ft$^2$ |
| Lift = 48.3 lbs | *A.R. = 3.0 | A.R. = 3.0 | A.R. = 1.5 |
| L/W = 48.3/43.9 = 1.10 | **Ct/Cr = .6 | Ct/Cr = .6 | Ct/Cr = .6 |
| Vol = 961 ft$^3$ | | | |

*Aspect ratio
**Tip chord/Root chord

TABLE II

| TYPICAL WEIGHT STATEMENT | |
|---|---|
| Payload Pod and Sensing System: | |
| Seeker Assembly-Incl. Window and Structure | 9.27 lbs. |
| Battery | 3.50 |
| Power Supply | 2.50 |
| Wire Harness | 1.00 |
| Control Electronics | |
| Elect./Fiber Optics Interface Board | 1.76 |
| Rate Gyro | 1.81 |
| Battery Bracket | .31 |
| Gyroscope Mounting Bracket | .29 |
| 1000 meters Optical Fiber | .40 |
| SUBTOTAL | 20.84 lbs. |
| Main Body and Aerodynamic Device: | |
| Balloon Body Including Dilation Panel | 7.91 lbs. |
| Dilation Panel Elastic Lines | .16 |
| Balloon Bridal Lines | .13 |
| Fill/Pressure Relief Valves | .26 |
| Wing/Tail Surfaces | 3.00 |
| SUBTOTAL | 11.64 lbs. |
| Tether Cable (1000 meters) | 6.90 |
| 15% He/85% H$_2$ Gas Mixture | *4.20 |
| Miscellaneous - Attachments, Etc. | .50 |

TABLE II-continued

TYPICAL WEIGHT STATEMENT

GROSS WEIGHT: **43.90 lbs.

*Based on max volume and minimum lift at 5000 ft. above sea level plus 1000 meters = 8281 ft./72.4° F. (Hot Day)
**Lift = 1.10 × 43.9 = 48.3 lbs (main body and aerodynamic surfaces only).

The main body and lifting surfaces can be of any dimensions capable of lifting the desired payload to the desired altitude under desired atmospheric conditions. FIGS. 3-A, B and C is typical of a specific application of this concept.

FIG. 3C illustrates that a typical main body with the least amount of surface area for the forward semi-spherical portion of main body 38 has a radius of 5.14 feet while the aft end semi-spherical portion of main body 38 has a radius of 1.5 feet. Thus providing a preferred ratio of 5.14/1.5 or about 3.4 with respect to the forward and aft semipherical portions of main body 20. With the dimensions shown in FIG. 3C, the frusto-conical mid-region slopes downwardly from the forward to the rearward end of main body 38. In addition, stub wings 42, 44 are shown to have a total span of 15.6 feet. Also, a the dimensions shown in FIGS. 3A-C the center of gravity of the surveillance balloon is positioned about 1.8 feet below the horizontal bisecting plane H and 3.37 feet rearward of the forwardmost edge of the main body 38. FIG. 3B shows that the center of gravity of the surveillance balloon lies on the vertical bisecting plane and also on a vertical plane which is in line with the forwardmost edge of stub wings 42, 44.

Preferably stub wings 42 and 44, main body 38 and stabilizing fins 46, 48 and 50 are formed of a transparent or translucent material such as the aramid synthetic fiber sold under the trademark KEVLAR which is relatively inexpensive and thus the balloon can be discarded after use. The use of KEVLAR (TM) material also avoids radar detection as the material is radar transparent. Other possible materials contemplated include various plastics. It is well known in the art how to fabricate radar transparent materials and any such materials can be used for the purposes of the invention. The inflatable stub wings 42, 44 and stabilizing fins 46, 48 and 50 can either be inflated separately or, as in a preferred embodiment, all together with the filling of main body 38.

Figure 4:
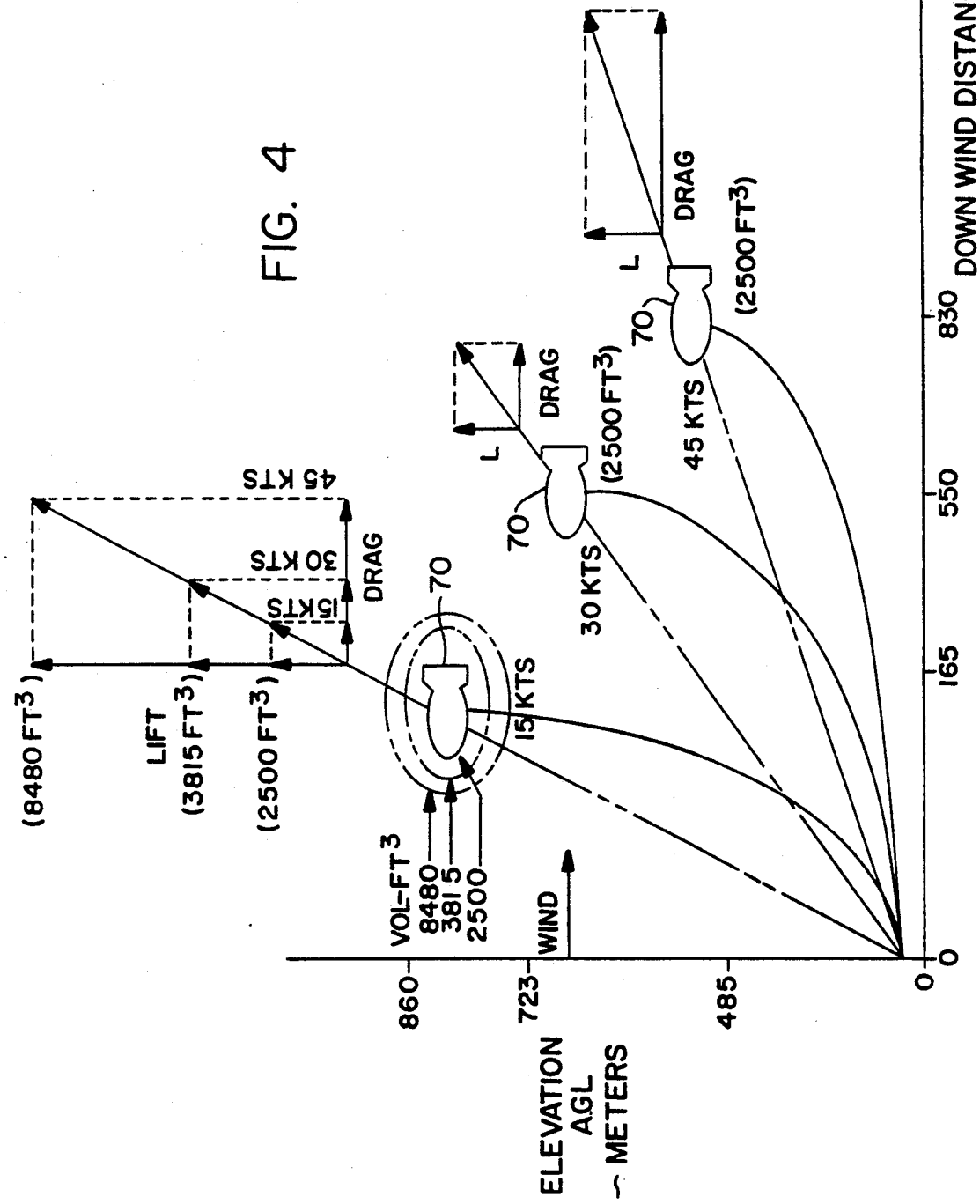
FIG. 4 shows, graphically, calculated positions assumed by various sized gas filled balloons in various wind conditions.

FIG. 4 illustrates graphically the calculated affect that wind has on various dimensioned inflated balloons such as those found in the prior art. The prior art balloon 70, shown in FIG. 4 having a volume of 2,500 ft$^3$ and a tether length of approximately 1,000 meters, is depicted as having drifted downwind approximately 165 meters when wind conditions are 15 KTS. A gas filled balloon having a volume of 2,500 ft$^3$ with a total gross weight of about 58 pounds would be expected to maintain an equilibrium elevation of about 1000 meters above ground level (AGL) for zero wind conditions. Thus, wind conditions of 15 KTS cause prior art balloon 70 not only to drift downwind from its anchor position but also to drop in altitude. When prior art balloon 70 is at its equilibrium altitude of about 1000 meters AGL, its tether line is vertical under zero wind conditions. However, wind conditions of 15 KTS result in a drop in altitude from equilibrium to about 860 meters AGL and down wind is 165 meters.

In wind conditions of 30 knots, prior art balloon 70 drops even lower and is forced further downwind from its anchor position.

FIG. 4 reveals that the 2,500 ft$^3$ balloon, when faced with wind conditions of 30 knots, will drop to an altitude of about 723 meters AGL and be about 550 meters down wind from the anchor position. For wind conditions of 45 knots the prior art balloon 70 is calculated as being forced horizontally to about 830 meters down wind from its anchor position and at an altitude of 485 meters AGL.

FIG. 4 illustrates the calculated increase in balloon volume required for a prior art balloon of 2500 ft.$^3$ to maintain an elevation of 860 meters AGL and 165 meters down wind. It can maintain these conditions with a 15 KTS wind. At 30 KTS its volume would have to increase to 3815 ft$^3$ and at 45 KTS to 8480 ft$^3$.

Figure 5:
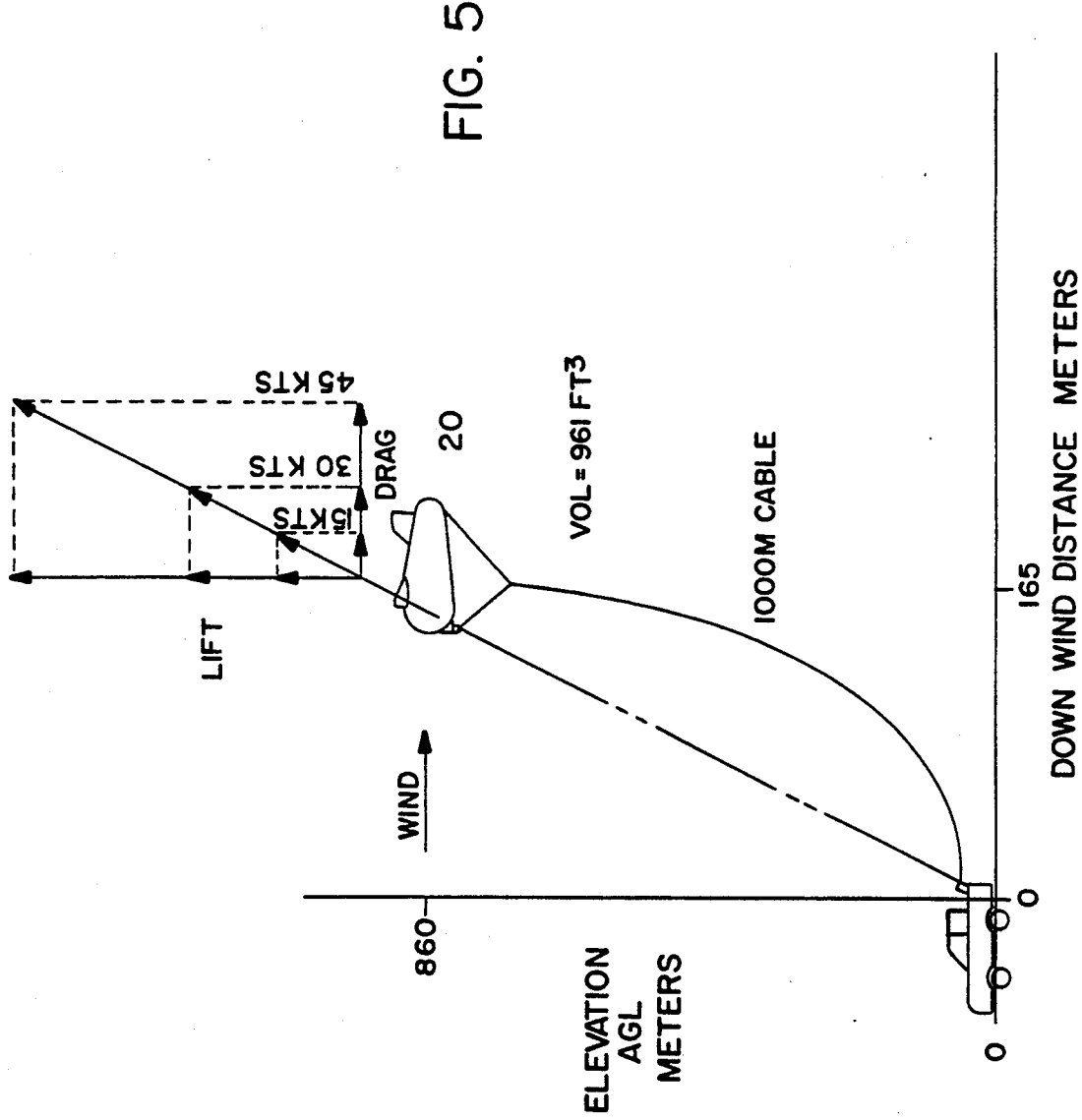
FIG. 5 shows, graphically, the calculated position the present invention would assume for various wind conditions.

FIG. 5 represents a calculated approximation of the position surveillance balloon 20 would assume in wind conditions of 15, 30 and 45 knots. Surveillance balloon 20, with a minimum volume of 961 ft$^3$ and a gross weight of 43.90, would maintain a position of 860 meters AGL and 165 meters downwind in wind conditions of 15, 30 or 45 knots. The ability to maintain an altitude of about 860 meters for wind speeds of 15, 30 or 45 knots is brought about by the inclusion of aerodynamic lifting device 40 which is shown to be a pair of stub wings in FIG. 5. Stub wings 42, 44 enable surveillance balloon 20 to maintain a high upward lift even in high wind conditions and thus surveillance balloon 20 is not forced further downwind or reduced in altitude due to increased wind velocities.

Although the maintenance of the balloon at about 86% of the equilibrium height would be suitable for most anticipated field uses, it is also contemplated that the balloon's lift-to-weight ratio and the aerodynamic means be such that the balloon is maintained at about 75-90% of the equilibrium height or more preferably at about at least 80% of the equilibrium height for winds of up to 45 mph.

Figure 6:
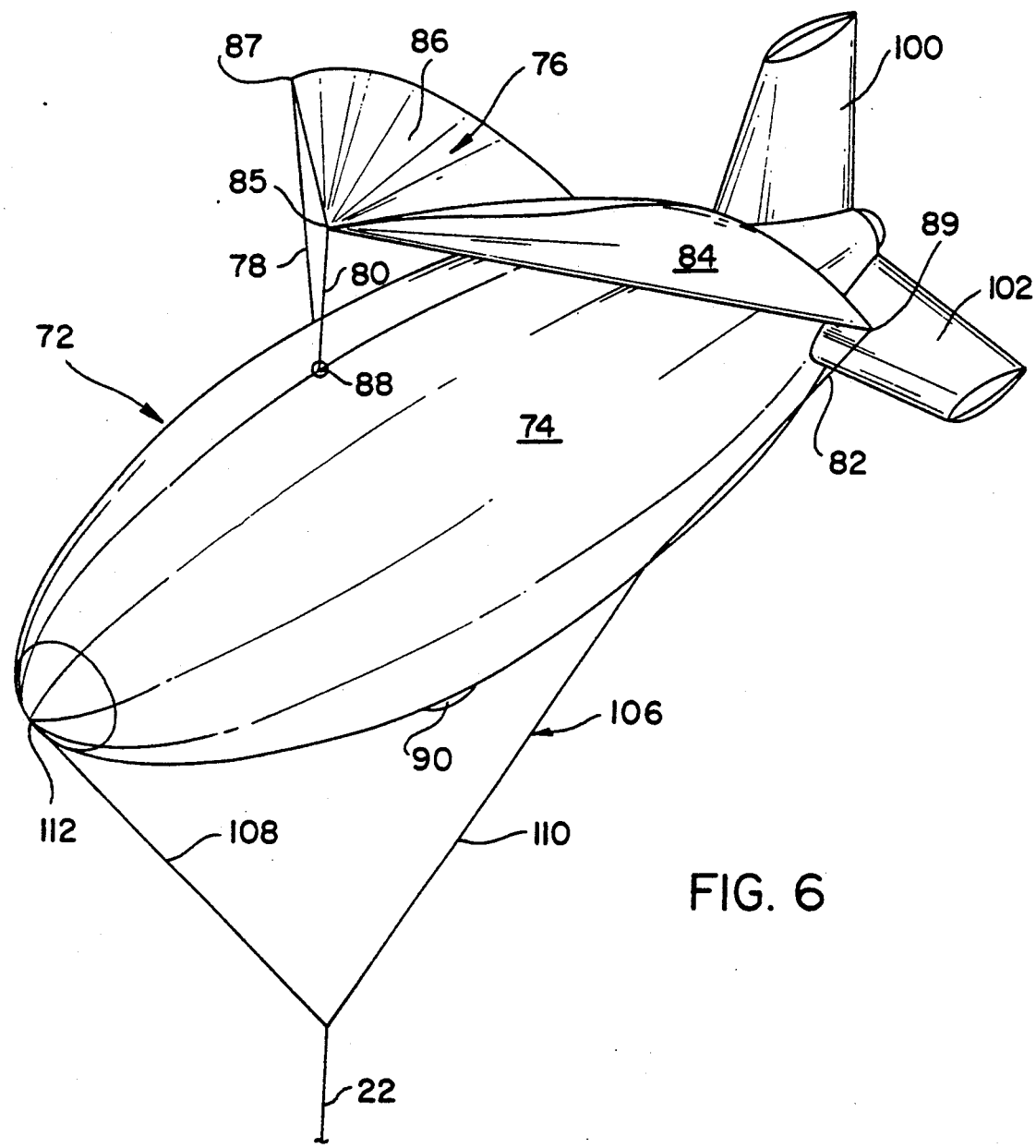
FIG. 6 shows, in perspective, a second embodiment of the invention.

FIG. 6 shows, in perspective, a second embodiment of the present invention. Surveillance balloon 72 in FIG. 6 is shown to have inflated main body 74 which is ellipsoidal in shape.

Positioned above the upper surface of main body 74 is flex wing 76 which is connected to main body 74 by way of lines 78, 80, 80a and 82. Lines 78 and 82 extend from lateral edges 87 and 89 of flex wing 76 to a connection point below the horizontal plane bisecting main body 74 as shown in FIG. 6A. Connection line 80 and 80a are attached to forward and aft tips of flex wing 76 and to connection means 88 on the upper surface of main body 74. Suitable material for connection lines 78, 80 and 82 includes KEVLAR (TM) or NYLON (TM) material. Most preferably, connection lines 78, 80, 80a and 82 are formed of KEVLAR (TM) material which is easily flexed, is radar transparent and does not stretch.

Figure 10:
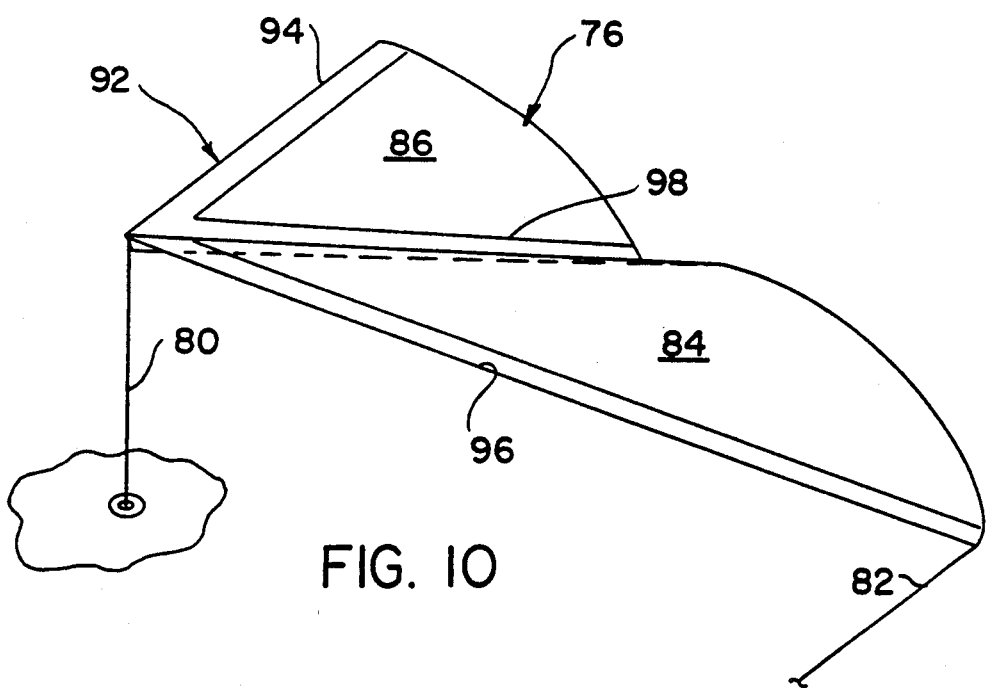
FIG. 10 shows in greater detail the lifting device utilized in the second embodiment of the invention.

The flex wing 76, commonly referred to as a Rogallo wing after the name of the inventor, is preferably bifurcated in shape with left wing portion 84 and right wing portion 86. Flex wing 76 is also preferably formed of a single layer of lightweight material such as MYLAR (TM) material or it could be fabricated of coated paper, plastic or coated cloth which is either woven or not woven. The material used for flex wing 76 is water impermeable such that surveillance balloon 72 is operational in virtually all weather conditions. The material in flex wing 76 is also one that is radar transparent and relatively inexpensive so as to allow surveillance balloon 72, with the exception of payload pod 90, to be discarded after use. Flex wing 76 has a frame structure to help maintain its shape. FIG. 10 shows frame structure 92 which helps to maintain the Rogallo shape of flex wing 76. Wing leading edge frame structure 92 includes leading edge frames 94 and 96 and centerline frame 98. The materials used for frame structure 92 are also preferably both visually transparent and radar transparent. Suitable materials include inflated MYLAR (TM) material tubes, wood or clear plastic.

Leading edges 94 and 96 as well as bifurcation member 98 can also be in the form of pressurized chambers filled with either air or a lighter gas. In utilizing frame structure 92, left and right wing portions 84 and 86 are either a single layer or a plurality of laminated layers. For further lift, it is also possible that flex wing 76 be inflatable whereby upper and lower gas impermeable layers are sealed along their edges and sewn or secured together to provide the desired shape upon inflation.

Figure 6B:
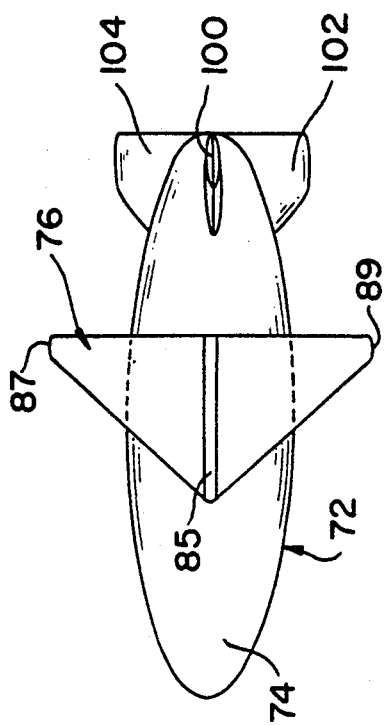
FIG. 6B shows a planar view of the embodiment shown in FIG. 6.

Inflatable main body 74 also includes vertical stabilizing fin 100 and horizontal stabilizing fins 102 and 104 as shown in FIG. 6B.

Harness 106 (FIG. 6) includes front harness line 108 and aft harness line 110. Front harness line 108 is secured to connecting point 112 forming the forwardmost point on ellipsoidal main body 74. Aft harness line 110 is connected to a rearwardmost point (not shown) of main body 74. Both front and aft harness lines converge inwardly from their point of connection with main body 74 to a common attachment point with tether line 22.

Referring to FIG. 6A, there is shown connecting lines 78, 82 converging inwardly to respective attachment devices 114, 116. Suitable attachment devices include a plastic ring attached to the side of main body 74 by adhesives.

Figure 6C:
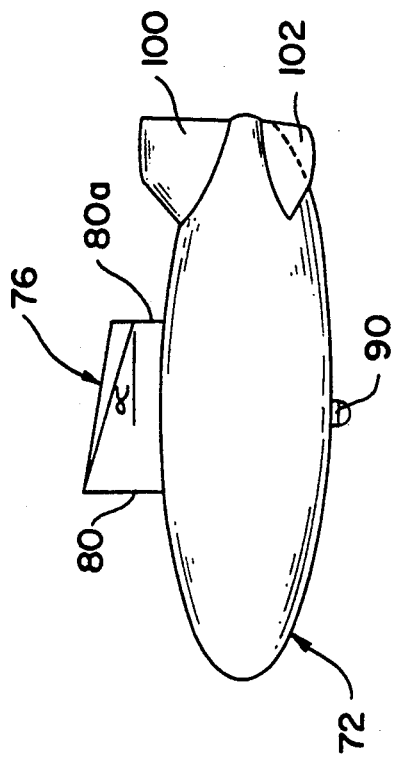
FIG. 6C shows a side view of the embodiment shown in FIG. 6.
Figure 6A:
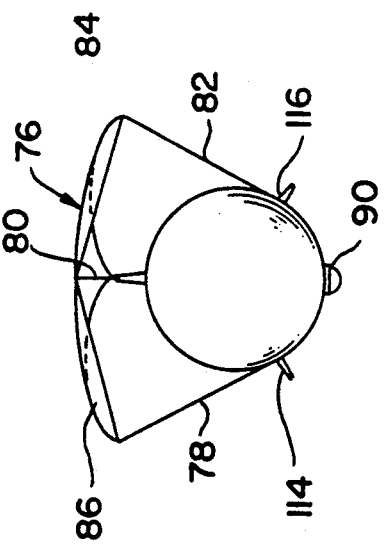
FIG. 6A shows a front elevational view of the embodiment shown in FIG. 6.

FIG. 6C reveals the angle of attack that flex wing 76 assumes. The angle of attack in FIG. 6C is designated α. The angle of attack assumed by flex wing 76 enables incoming wind to create the proper dynamic upward lifting of surveillance balloon 72 a typical range for angle α would be about 10°–25°.

FIGS. 7A–C represent typical dimensions and angular arrangements for a useful load of from 18 to 20 pounds. The dimensions for FIGS. 7A–C are as follows (all dimensions are in feet unless otherwise indicated):
S=13.7
T=7.62
U=7.125
V=3.24
W=1.2
X=8.19
Y=15°
Z=2.5
AA=4.8
BB=11.43
CC=22.86
DD=7.0
EE=0.4

Other dimensions and angular arrangements variations are also possible, depending on useful load and design criteria desired. As can be seen, the center of gravity of surveillance balloon 72 falls close to the center point of flex wings 76.

Figure 8:
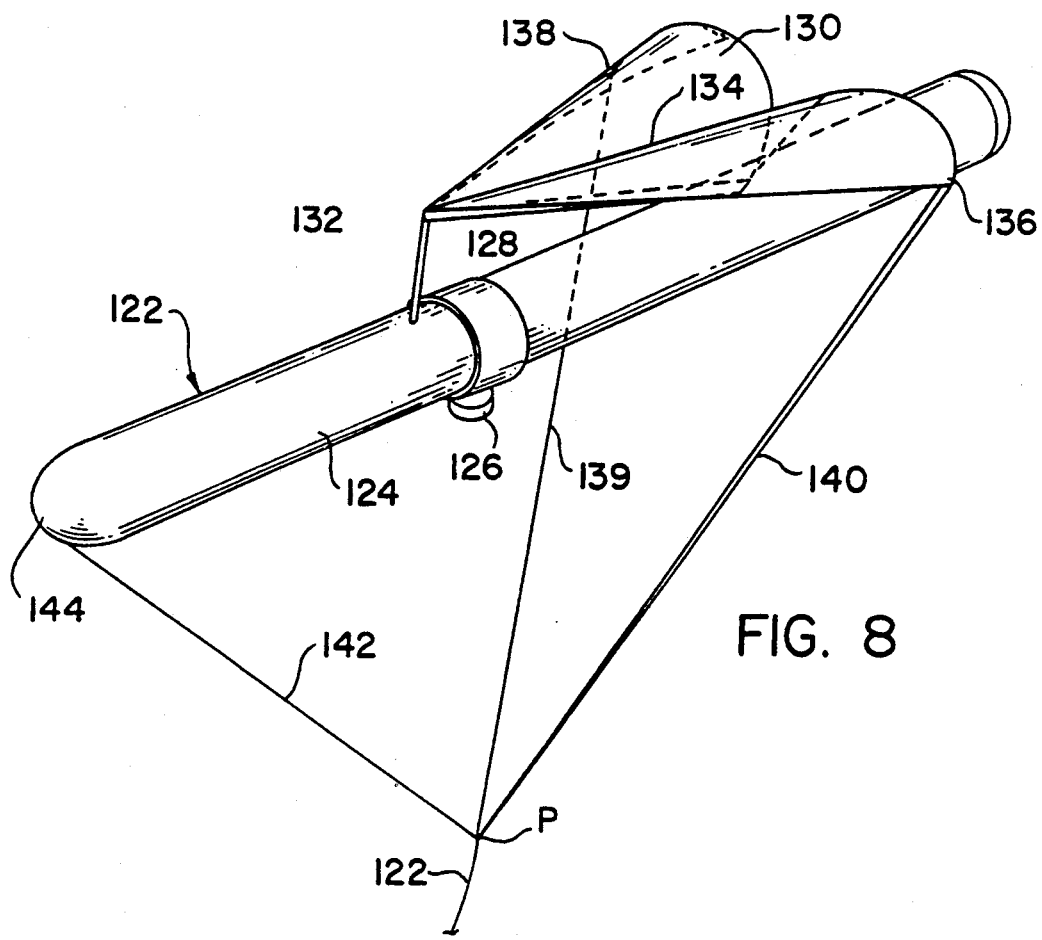
FIG. 8 shows a perspective view of a third embodiment of the invention.

FIG. 8 shows a third embodiment of the present invention having surveillance balloon 122 with a cylindrical shaped inflatable main body 124. Payload pod 126 is suitably attached to main body 124.

Flex wing 130 of surveillance balloon 122 is similar to that of the second embodiment shown in FIG. 6. First and second harness lines 139 and 140, respectively, are attached at one end to flex wing 130 at points 136 and 138. Rather than connecting harness lines 139 and 140 to inflated main body 124, harness lines 139, 140 are connected directly to tether line 22 for stability. An additional harness line 142 extends from common connecting point P to forwardmost point 144 of main body 124.

Figure 9:
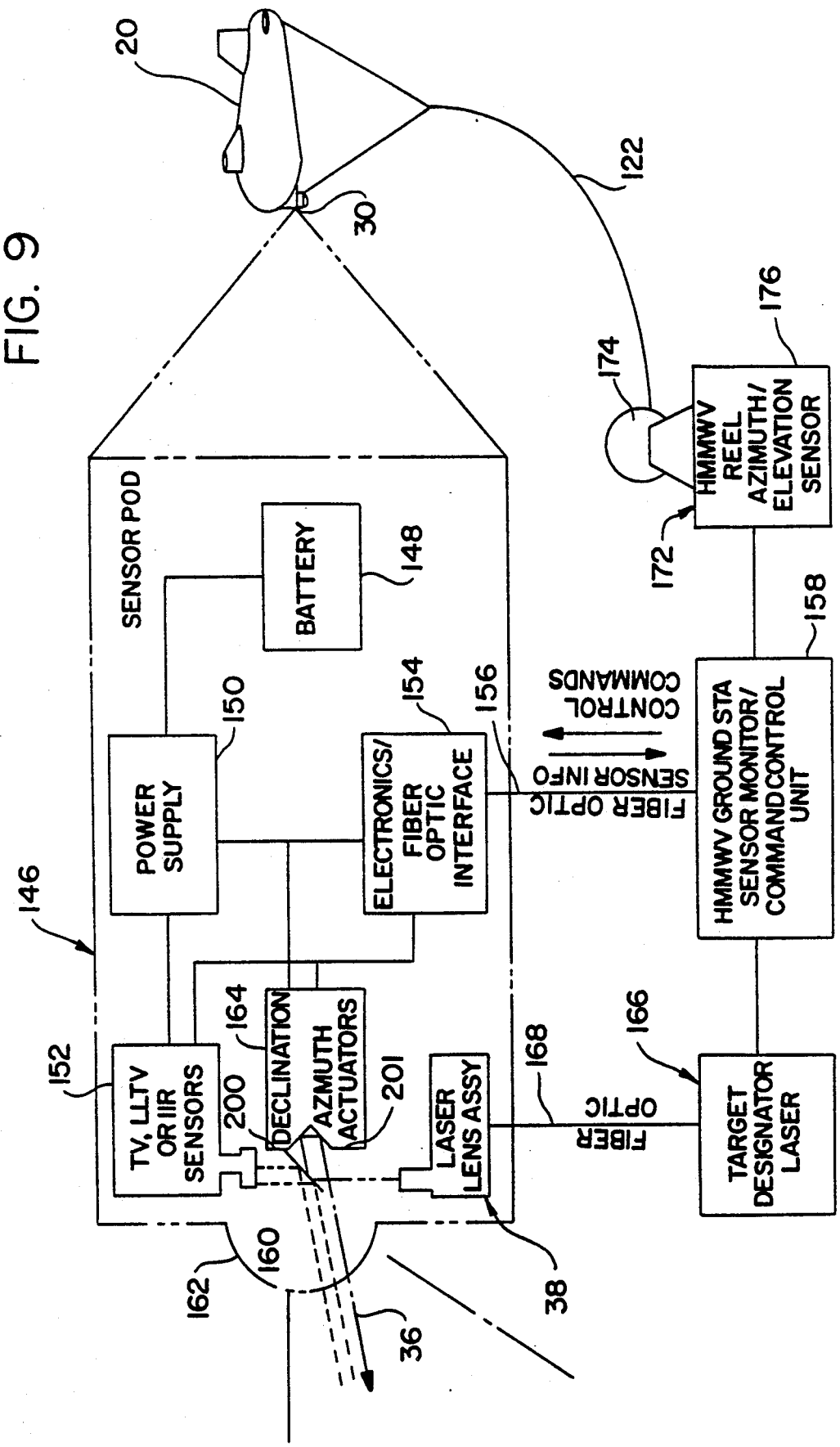
FIG. 9 shows a schematic view of a typical sensing system contained in the payload pod and a typical ground station for the sensing system.

FIG. 9 illustrates, schematically, sensing system 146 positioned within payload pod 30 of surveillance balloon 20. Sensing system 146 includes its own power source comprised of battery 148 connected with power supply 150. Sensing means 152, can include a television camera, a low light level TV (LLTV) or an imaging infrared sensor (IIR), radar or any combination thereof. In this example, both power supply 150 and sensing means 152 are electronically connected to an electronic/fiber-optic interface device 154. A fiber-optic line 156 links electronics/fiber-optic interface device 154 with sensor monitor/command control unit 158 maintained at mobile ground station 28 (FIG. 1). Mirror 160 positioned directly behind skydome 162 reflects visual signals to sensing means 152. Mirror 160 can be adjusted for various angles upon actuation of declination/azimuth actuating means 164 which is in electrical communication with electronics/fiber-optic interface device 154.

In addition to sensing system 146, laser target system 166 is also provided for use with surveillance balloon 20. Laser target system 166 includes a fiber-optic interlink 168 in connection with laser lens assembly 38. The laser reflects off the back of mirror 160 and is further reflected by two additional mirror surfaces, 200 and 201, so that laser 36 is reflected onto the target parallel to the view coming into sensor 152. The use of fiber-optic interlinks also avoid the possibility of having radio control signals detected or jammed. Target designator laser 166, positioned at mobile ground station 28 and, in communication with command control unit 158, acts in conjunction with laser lens assembly 38 and mirrors 160, 200 and 201 to provide laser detection line 36. Command control unit 158 also has a reeling device 172 which is suitable for reeling out the tow line for deployment of the balloon and to reel it in to recover the useful load as well as the balloon, if desired. Reeling device 172 includes reel 174 as well as azimuth/elevation sensor 176 which provides electronic signals to control unit 158 and translates those signals into the appropriate information of azimuth angle and balloon elevation. Various other sensing devices and designation devices are also contemplated such as a low radar (not shown) which can be used under adverse weather conditions.

The invention thus features a winged, least volume, surveillance balloon with low visual ground or air observability and with no acoustic, infrared, radio frequency or radar signature. Moreover, the present invention maintains the balloon elevation virtually regardless of wind velocity. The present invention also provides a low cost balloon system which can be discarded after use or deflated and re-inflated for later operations, if desired.

Although the dimensioned embodiments of the present invention have been described with respect to specific useful load weights, many modifications and changes may be effected by those skilled in the art without departing from the scope and spirit of the invention as appended hereinafter.

What is claimed is:

1. A tethered balloon, comprising:

an inflatable main body which is essentially cylindrical;

a delta-shaped flex wing having a tip and a trailing edge with two end sections;

attachment means attaching said flex wing to said main body, said attachment means including a first line attached at one end to said tip and at the other end to said main body, second and third lines attached to a respective one of said end sections and converging to a common point of attachment with a tether line, said main body having a lift-to-weight ratio of about 1.05 to 1.15 such that said main body has a minimized volume for providing essentially only sufficient enough lift to raise said main body to the length of said tether line while said surveillance balloon is in still air conditions;

and said flex wing being dimensioned and arranged so as to maintain said tethered ballon, when subject to winds of up to 45 mph, at an altitude level which is between 75 to 90% of the still air altitude said surveillance balloon would assume.

2. A minimum volume tethered surveillance balloon comprising:

an inflatable main body having a semi-spherical front end, a frusto conical mid-region which converges in a direction away from said front end, and a semi-spherical aft end, said main body further including stabilizing fins positioned at the aft-end of said main body;

stub wings adjoined to said main body at an upper-front region of said main body in an area where the semi-spherical front end joins with the frusto conical mid-region;

a payload pod supported by said main body;

a tether line;

means for connecting said tether line to said main body; and said surveillance balloon having a lift-to-weight ratio of between about 1.05 to 1.15 such that said surveillance balloon has a minimized volume for providing essentially only sufficient enough lift to raise said main body to the length of said tether line while said surveillance balloon is in still air conditions, and said stub wings being dimensioned and arranged so as to maintain said tethered surveillance balloon, when subjected to winds of up to 45 mph, at an altitude level which is at least 80% of the still air altitude said surveillance balloon would assume.

3. A tethered balloon as recited in claim 2, wherein there are a pair of stub wings and the combined volume of said pair of stub wings and stabilizing fins contribute to the total lift due to displacement of ambient air.

4. A tethered balloon as recited in claim 2, wherein said inflatable main body has a lift-to-weight ratio of about 1.1.

5. A tethered balloon as recited in claim 2, wherein said main body includes a dilation pocket which comprises flexible panels extending inwardly from the exterior of said main body so as to form a collapsible and expandable recess which opens and closes in response to variations in atmospheric pressure.

6. A tethered balloon as recited in claim 2, wherein said stub wings are dimensioned and arranged to maintain said tetherable balloon at a height of about 86% of the total length of the tether line in attachment with said balloon in winds of up to 45 KTS.

7. A tethered balloon as recited in claim 2, wherein said main body and said stub wings are formed of an essentially visibly transparent material.

8. A tethered balloon as recited in claim 7, wherein said main body and said stub wings are formed of an essentially radar transparent material.

9. A tethered balloon as recited in claim 2, wherein said semi-spherical front end has a radius which is about 3 to 4 times greater than the radius of said semi-spherical aft end.

10. A tethered balloon as recited in claim 2, having a pair of said stub wings attached on opposite sides of said main body with a leading edge forward of the area of integral connection between said front end and said mid-region and a trailing edge rearward of the area of integral connection between said front end and said mid-region.

11. A tethered balloon as recited in claim 2, wherein said stub wings angle upwardly to form a dihedral angle from the horizontal.

12. A tethered balloon as recited in claim 2, wherein said main body includes a dilation pocket which comprises flexible panels extending inwardly from the exterior of said main body so as to form a collapsible and expandable recess which opens and closes in response to variations in atmospheric pressure and said dilation pocket is positioned between a pair of outwardly extending stub wings.

13. A tethered balloon as recited in claim 2, wherein said payload pod has surveillance means for detection of objects, and said surveillance means including means for relaying retrieved information to a ground station.

14. A tetherable balloon as recited in claim 13, further comprising a laser target designation system positioned within said pod, said laser target designation system also including means for determining the range and location of an object.

15. A minimum volume tethered surveillance balloon comprising:

an inflatable main body having an elongated shape and stabilizing fins provided on an aft-end of said main body;

a flex wing positioned above said main body;

means for securing said flex wing to said main body;

a payload pod supported by said main body;

a tether line;

connection means connecting said tether line to said main body;

said main body having a lift-to-weight ratio of about 1.05 to 1.15 such that said main body has a minimized volume for providing essentially only sufficient enough lift to raise said main body to the length of said tether line while said surveillance balloon is in still air conditions;

and said flex wing being dimensioned and arranged so as to maintain said tethered balloon, when subject to winds of up to 45 mph, at an altitude level which is between 75 to 90% of the still air altitude said surveillance balloon would assume.

16. A tethered balloon as recited in claim 15, wherein said main body is ellipsoidal in shape and said flex wing is delta shaped with a forward tip positioned forwardly of the center of gravity of said ellipsoidal main body and a trailing edge positioned rearwardly of the center of gravity of said ellipsoidal main body.

17. A tethered balloon as recited in claim 15, wherein said flex wing is delta shaped and said connection means includes a forward line connected at one end to a forward tip of said wing and at the opposite end to said main body, an aft line connected at one end to a central portion of the aft end of said flex wing and to the main body at the other end, a third and a fourth line connected at one end to a lateral end of said flex wing and at the other end to a point below a horizontal plane bisecting the main body.

18. A tethered balloon as recited in claim 15, further comprising a frame structure for supporting said flex wing, and said flex wing being bifurcated with said frame structure including an essentially rigid centerline frame and essentially rigid wing leading edge frames with flexible wing portions extending in between the centerline and leading edge frames.

19. A tethered balloon as recited in claim 18, wherein said connection means positions said central frame support at an incline of about 15° with the forward end of said central frame support being further away from said main body than said aft end.

20. A tethered balloon as recited in claim 19, wherein said connection means includes flexible lines extending from lateral tips of said flex wing to said main body.

21. A tethered balloon as recited in claim 15, wherein said flex wing is generally delta shaped.

22. A tethered balloon as recited in claim 15, wherein said main body is ellipsoidal in shape.

23. A tethered balloon as recited in claim 15, further comprising a harness which includes a first line in connection with the forward and aft ends of said main body and second and third lines extending from the lateral extremities of said flex wing, and said first, second and third lines being joined at a common point below said main body to a tether line.

24. A tethered balloon as recited in claim 15, wherein said flex wing and said main body are formed of a material which is both essentially radar transparent and essentially visibly transparent.

25. A tethered balloon as recited in claim 15, wherein said flex wing is inflatable.

26. A tethered balloon as recited in claim 25, wherein said flex wing includes a frame structure and said frame structure is comprised of a plurality of gas filled tubes.

27. A tethered ballon as recited in claim 15, wherein said main body includes a dilation pocket which comprises flexible panels extending inwardly from the exterior of said main body so as to form a collapsible and expandable recess which opens and closes in response to variations in atmospheric pressure.

28. A method of surveillance which includes the steps of:
 inflating a tethered surveillance balloon having a main body and aerodynamic means for enhancing lift in high wind conditions with a gas which is lighter than air;
 raising said surveillance balloon which has a lift-to-weight ratio of between 1.05 to 1.15 and a minimum volume which provides essentially only sufficient enough lift to raise said main body to the length of the tether when said surveillance balloon is in still air conditions;
 maintaining said surveillance balloon at an altitude at least about 80% of an equilibrium altitude said balloon would assume in zero wind conditions for wind conditions up to 45 KTS without adjusting the tether line.

29. A method of surveillance as recited in claim 28, further comprising forming said balloon of a material which is essentially visibly and radar transparent.

30. A tethered balloon as recited in claim 5, having a pair of said stub wings attached on opposite sides of said main body and said dilation pocket extending in a forward to aft direction and being positioned about midway between said dilation pocket.

31. A tethered balloon as recited in claim 11 wherein said stub wings are inclined about 10° upwardly from the horizontal.

32. A tethered balloon as recited in claim 23, wherein said main body is essentially cylindrical in shape with semi-spherical front and aft ends.

* * * * *